(12) United States Patent
Pratt

(10) Patent No.: US 9,212,678 B2
(45) Date of Patent: Dec. 15, 2015

(54) FASTENER AND METHOD OF INSTALLING SAME

(75) Inventor: John D. Pratt, Laguna Niguel, CA (US)

(73) Assignee: John D. Pratt, Laguna Niguel, CA (US)

( * ) Notice: Subject to any disclaimer, the term of this patent is extended or adjusted under 35 U.S.C. 154(b) by 303 days.

(21) Appl. No.: 13/443,658

(22) Filed: Apr. 10, 2012

(65) Prior Publication Data

US 2012/0263556 A1 Oct. 18, 2012

Related U.S. Application Data

(60) Provisional application No. 61/475,323, filed on Apr. 14, 2011.

(51) Int. Cl.
*F16B 19/00* (2006.01)
*F16B 19/10* (2006.01)

(52) U.S. Cl.
CPC ......... *F16B 19/1072* (2013.01); *F16B 19/1054* (2013.01)

(58) Field of Classification Search
CPC ... F16B 19/00; F16B 19/1054; F16B 19/1072
USPC ...................... 411/38, 43, 427, 361
See application file for complete search history.

(56) References Cited

U.S. PATENT DOCUMENTS

| | | | |
|---|---|---|---|
| 4,033,222 A | 7/1977 | Wilson | |
| 4,376,604 A | 3/1983 | Pratt et al. | |
| 4,451,189 A | 5/1984 | Pratt | |
| 4,457,652 A | 7/1984 | Pratt | |
| 4,537,542 A | 8/1985 | Pratt et al. | |
| 4,548,533 A | 10/1985 | Pratt | |
| 4,659,271 A | 4/1987 | Pratt et al. | |
| 4,659,272 A | 4/1987 | Pratt | |
| 4,681,494 A | 7/1987 | Pratt et al. | |
| 4,747,204 A | 5/1988 | Pratt | |
| 4,752,169 A * | 6/1988 | Pratt | ............................... 411/43 |
| 4,767,248 A | 8/1988 | Pratt | |
| 4,967,463 A | 11/1990 | Pratt | |
| 5,046,348 A | 9/1991 | Pratt | |
| 5,052,870 A | 10/1991 | Pratt et al. | |

(Continued)

FOREIGN PATENT DOCUMENTS

WO  WO 2009/055298      4/2009
WO  WO2012142033 A2  10/2012

OTHER PUBLICATIONS

International Search Report and Written Opinion dated Jun. 20, 2012 PCT/US2012/032912.

*Primary Examiner* — Roberta Delisle
(74) *Attorney, Agent, or Firm* — Barnes & Thornburg LLP

(57) ABSTRACT

A fastener includes a body having a cylindrical passage formed through a central portion of the body and a tapered ramp disposed at an end of the body and a corebolt disposed within the passage formed by the body. The fastener further includes a sleeve movably disposed over the corebolt and adjacent the tapered ramp of the body. The sleeve includes a bore extending between first and second ends of the sleeve and a taper extending inwardly from the second end of the sleeve toward the first end of the sleeve, the second end of the sleeve being adjacent the tapered ramp of the body. The sleeve further includes a weakened interior region disposed between the taper and the first end of the sleeve, the weakened interior region being adapted to bulb outwardly when the sleeve is compressed against a workpiece.

37 Claims, 14 Drawing Sheets

(56) References Cited

U.S. PATENT DOCUMENTS

| | | |
|---|---|---|
| 5,056,973 A | 10/1991 | Pratt et al. |
| 5,066,179 A | 11/1991 | Pratt |
| 5,131,107 A | 7/1992 | Pratt et al. |
| 5,152,648 A | 10/1992 | Pratt |
| 5,333,980 A | 8/1994 | Pratt et al. |
| 5,354,160 A | 10/1994 | Pratt et al. |
| 5,378,098 A | 1/1995 | Andrews et al. |
| 5,620,287 A | 4/1997 | Pratt |
| 5,692,865 A | 12/1997 | Pratt |
| 5,884,923 A | 3/1999 | Pratt |
| 5,938,384 A | 8/1999 | Pratt |
| 5,941,539 A | 8/1999 | Pratt |
| 6,171,038 B1 | 1/2001 | Pratt et al. |
| 6,261,042 B1 | 7/2001 | Pratt |
| 6,866,226 B2 | 3/2005 | Pratt et al. |
| 6,866,227 B2 | 3/2005 | Pratt et al. |
| 7,131,672 B2 | 11/2006 | Pratt et al. |
| 7,252,311 B2 | 8/2007 | Pratt et al. |
| 7,255,376 B2 | 8/2007 | Pratt et al. |
| 7,578,475 B2 | 8/2009 | Pratt et al. |
| 7,857,563 B2 | 12/2010 | Pratt |
| 2013/0061452 A1 | 3/2013 | Pratt |
| 2014/0047699 A1 | 2/2014 | Pratt |

* cited by examiner

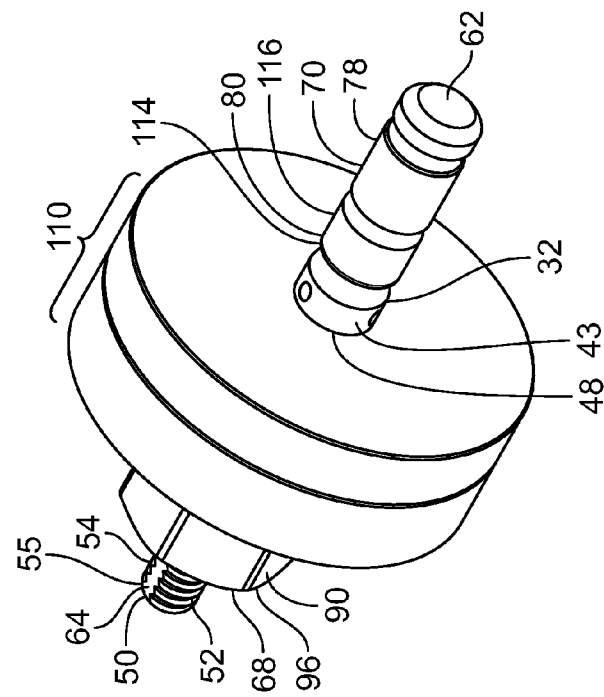
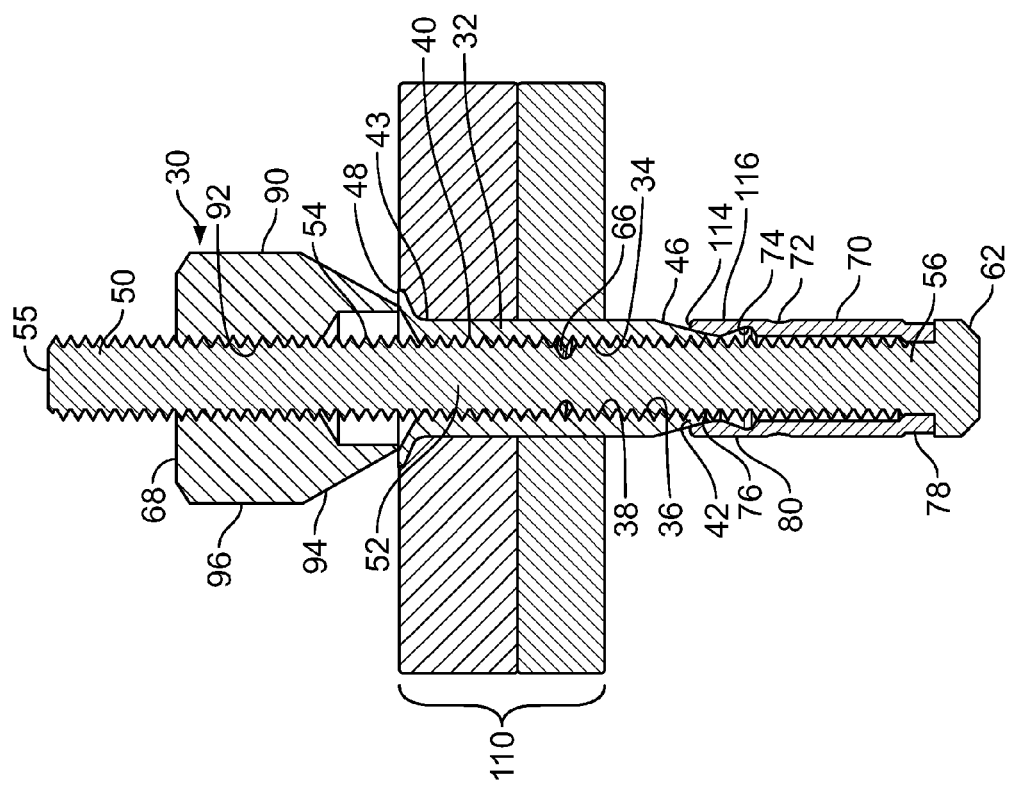
FIG. 3B
FIG. 3A

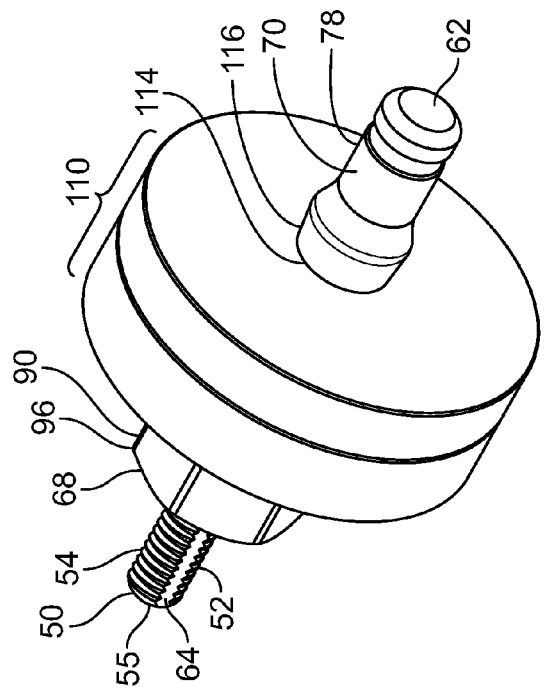
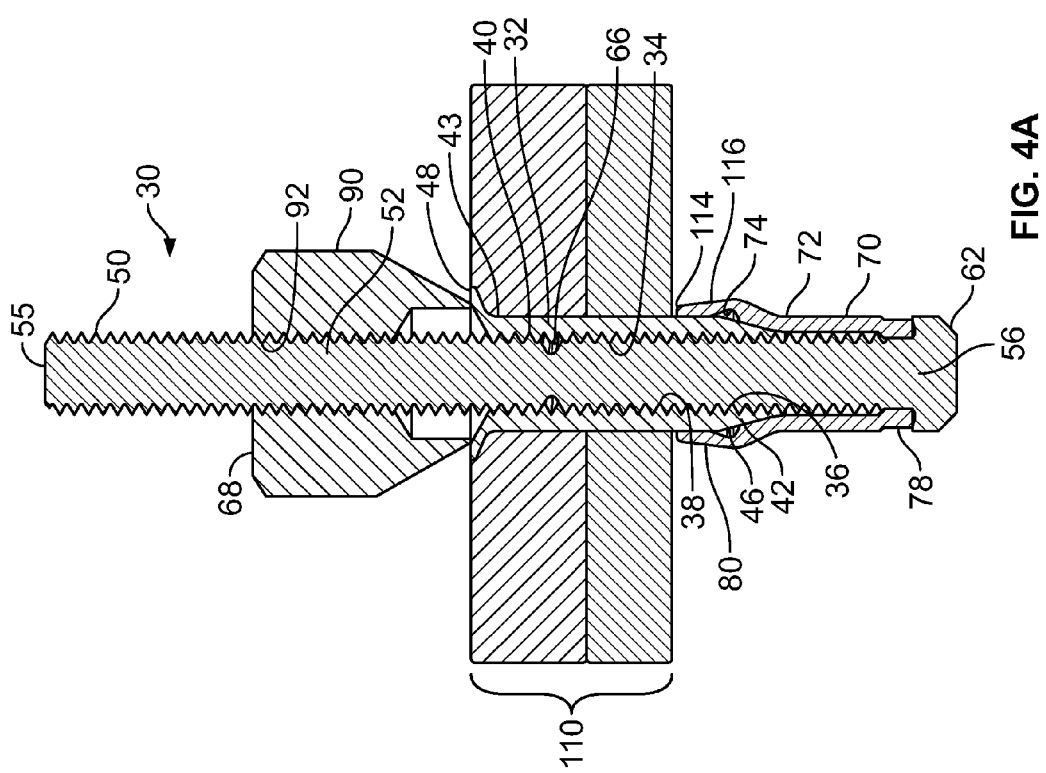
FIG. 4B
FIG. 4A

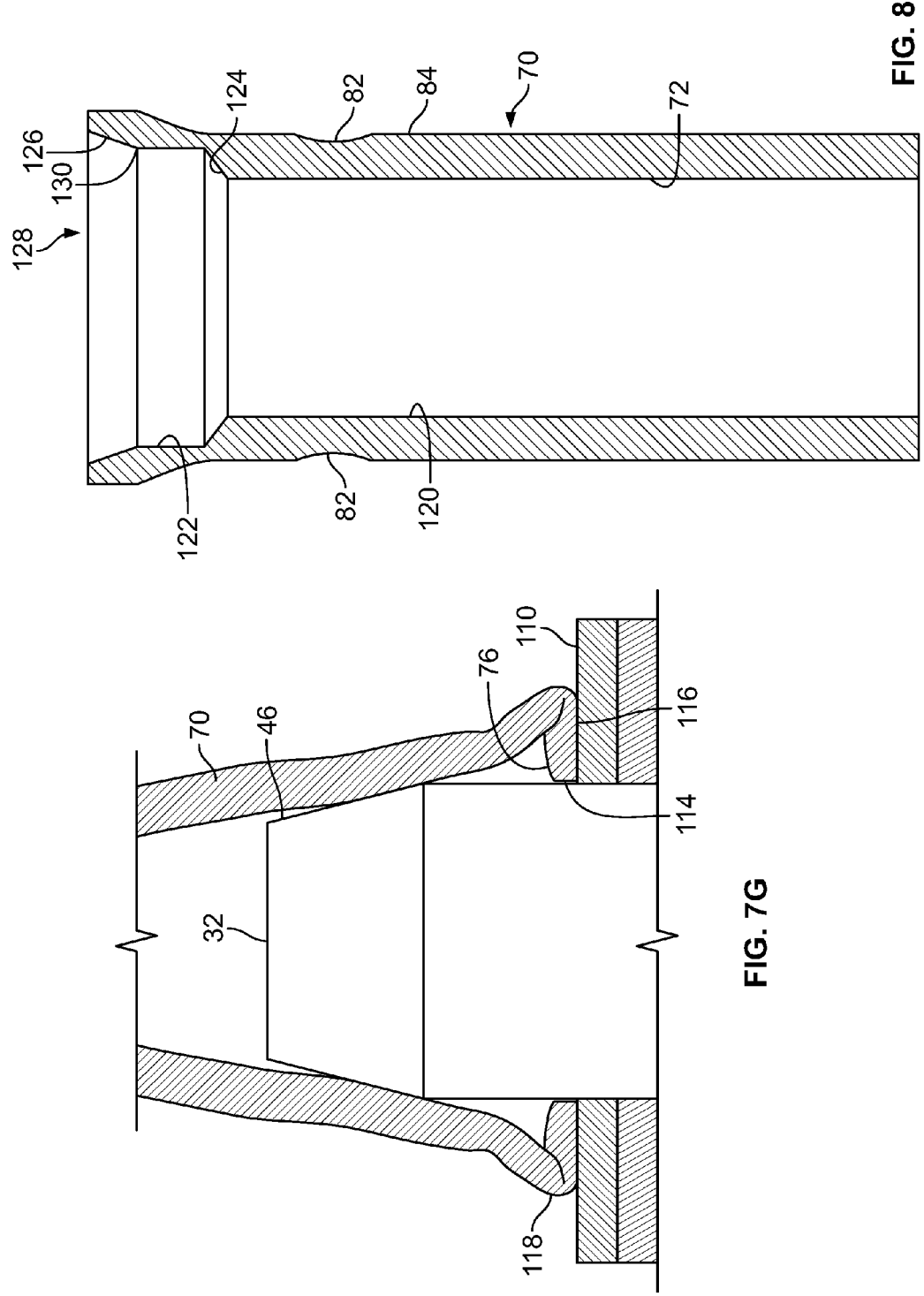

FASTENER AND METHOD OF INSTALLING SAME

CROSS REFERENCE TO RELATED APPLICATIONS

This application claims the benefit of priority under 35 U.S.C. §119(e) to U.S. Provisional Patent Application No. 61/475,323, filed Apr. 14, 2011, the content of which is incorporated herein by reference in its entirety.

BACKGROUND

The present disclosure relates to fasteners for assembling two or more panels of a workpiece, and more particularly to blind fasteners for assembling relatively thin sheet material or fragile laminated composites such as in aircraft structures or hybrid structures comprising metal and composites.

Joints in an airframe are generally subjected to shear and tensile loads such that mechanical fasteners used to construct those joints must function in cooperation with structural elements of the airframe to resist deformation and overloading. It is not enough to have a failure-proof fastener because, in many instances, it is a structural element that contains a weak link that causes failure. Mechanical fasteners must therefore be compatible with the materials and structural shapes that are joined so as to maximize the joint strength at the least cost. To help resist slippage or unwanted elongation of joints, aircraft fasteners are made to impart high clamping loads and/or to completely fill the aligned apertures in the structural elements.

Laminated composites pose a special challenge because high clamping loads can cause crushing or delamination damage that can degrade the strength of the composite material. Similarly, excessive press fits between the fastener and apertures in composite panels can also result in delamination and weakening. For this reason, fasteners destined for installation into laminated composites are typically designed with close-fit shanks to fill the apertures and enlarged bearing surfaces to spread the clamping loads over a large region. Providing enlarged bearing surfaces is relatively easy with conventional fasteners such as nuts and bolts as washer may be used. However, this is more difficult in blind fasteners because the fastener component providing the bearing surface for the blind-side panel must fit through the aperture and then expand somehow without damaging the fragile material.

Present blind fasteners typically form an enlarged blind side bearing surface, or upset, by either bulbing a region of the shank component against the blind side panel (such as with pull-type blind bolts) or by bulbing a separate sleeve against a surface of the blind side panel (as with threaded-type blind bolts). A drawback to the pull-type blind bolts is that the diameter of the blind head is generally limited to about 1.25D (where "D" represents the fastener shank diameter). Pull-type blind bolts also generally impart very low residual clamp to the structure with clamp loads generally in the range of 6,000 psi based upon the shank cross-sectional area. Current threaded type blind bolts, by contrast, are generally capable of producing enlarged blind heads of up to 1.5D and imparting residual clamp loads corresponding to 30,000 psi, based upon the shank cross-sectional area. For this reason threaded blind bolts tend to be the preferred style for structural joints comprising laminated composite materials in aircraft.

Drawbacks of presently-available bulbing threaded blind bolts include a limited gripping range and considerable variation in blind head bearing surface and clamping load between maximum grip condition and minimum grip condition. Other drawbacks include the need to incorporate a plastic insert into the sleeve to facilitate bulbing at a relatively low load and the need to grind or otherwise carefully control the shape of the fustro-conical ramp on a fastener body to avoid damage to the plastic insert.

A need therefore exists for a blind fastener that produces a predictable and consistent enlarged blind-side bearing surface and clamp load throughout an extended gripping range and that avoids the need for supplemental components (such as plastic inserts) or processing (such as high cost CNC machining or grinding) to control the bulbing action.

SUMMARY

According to one aspect of the present disclosure, a fastener or blind bolt includes a body having a cylindrical passage formed through a central portion of the body and a tapered ramp disposed at an end of the body. The fastener further includes a corebolt disposed within the passage formed by the body. A sleeve is movably disposed over the corebolt and adjacent the tapered ramp of the body. The sleeve includes a bore extending between first and second ends of the sleeve and a taper extending inwardly from the second end of the sleeve toward the first end of the sleeve, the second end of the sleeve being adjacent the tapered ramp of the body. The sleeve further includes a weakened interior region disposed between the taper and the first end of the sleeve, the weakened interior region being adapted to bulb outwardly when the sleeve is compressed against a workpiece.

According to another aspect of the present disclosure, a fastener includes a body having a cylindrical passage formed through a central portion of the body and a tapered ramp disposed at an end of the body and a corebolt having threading on at least a portion of an outer surface of the corebolt and disposed within the passage formed by the body. A sleeve is movably disposed over the corebolt and adjacent the tapered ramp of the body. The sleeve includes a bore extending between first and second ends of the sleeve and a taper extending inwardly from the second end of the sleeve toward the first end of the sleeve at an angle between about 5 degrees and about 30 degrees with respect to a longitudinal axis of the fastener. The sleeve further includes a weakened interior region disposed inwardly of the taper and adapted to bulb outwardly.

According to a further aspect of the present disclosure, a method of installing a fastener or blind bolt includes the step of inserting a fastener into a workpiece. The fastener includes a body with a cylindrical bore formed through a central portion of the body and a tapered ramp disposed at an end of the body, a corebolt disposed within the cylindrical bore, and a sleeve movably disposed over the corebolt and having a tapered surface at an end thereof that is adjacent the tapered ramp of the body and a weakened interior region disposed inwardly of the taper. The method further includes the step of rotating the corebolt while rotationally restraining the body, thereby causing the tapered surface of the sleeve to move along the tapered ramp until the sleeve comes into abutment with the workpiece. Still further, the method includes the step of further rotating the corebolt until the sleeve bulbs outwardly at the weakened interior region.

Other aspects and advantages of the present disclosure will become apparent upon consideration of the following drawings and detailed description, wherein similar structures have similar reference numbers.

BRIEF DESCRIPTION OF THE DRAWINGS

The detailed description particularly refers to the accompanying figures in which:

FIG. 3A is a cross-sectional view similar to that of FIG. 2 and depicting the fastener inserted into aligned apertures of two or more panels forming a workpiece;

FIG. 3B is a perspective view depicting the phase of installation of FIG. 3A;

FIG. 4A is a cross-sectional view similar to that of FIG. 3A after an installation tool has been activated to rotate the corebolt such that the corebolt moves inwardly toward the workpiece, thereby pushing the sleeve inwardly toward the workpiece;

FIG. 4B is a perspective view depicting the phase of installation of FIG. 4A;

FIGS. 7A-7G depict various stages of the sequence of forming the blind head of FIGS. 5A-6B as predicted by computer simulation with the sleeve shown in cross-section;

FIGS. 8 and 9 are cross-sectional views illustrating the formation of a weakened interior region and an interior tapered bore of the sleeve;

DETAILED DESCRIPTION

Figure 1:
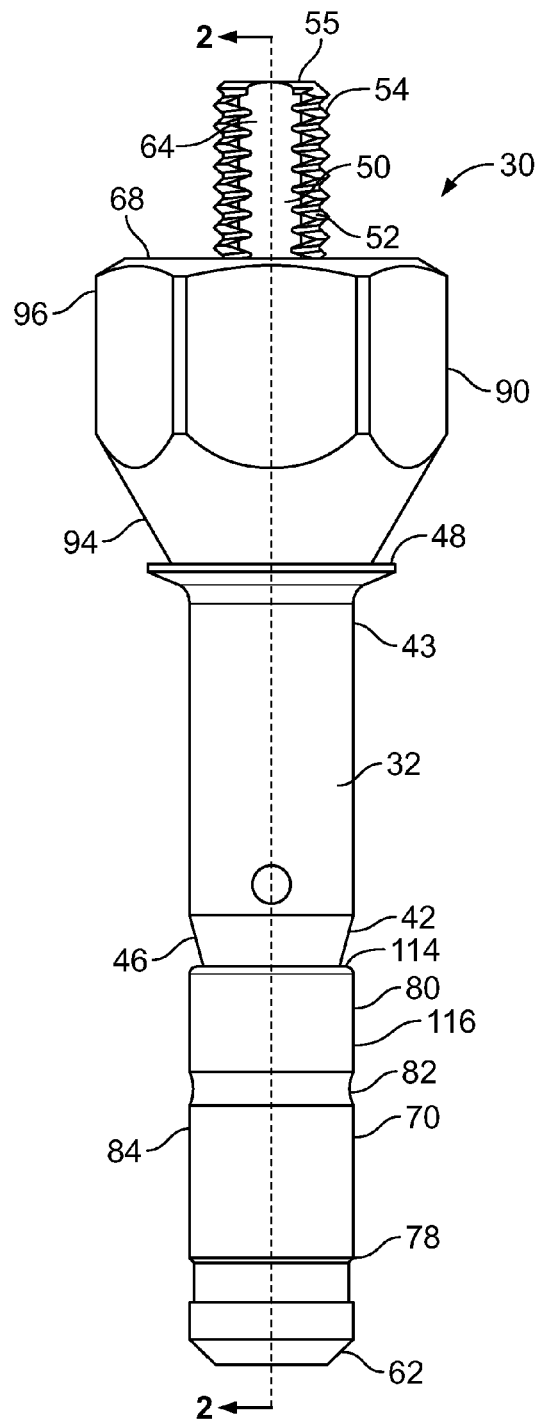
FIG. 1 is a side elevational view of a first embodiment of a fastener that may be used to connect two or more panels forming a workpiece by a single operator or mechanic.
Figure 2:
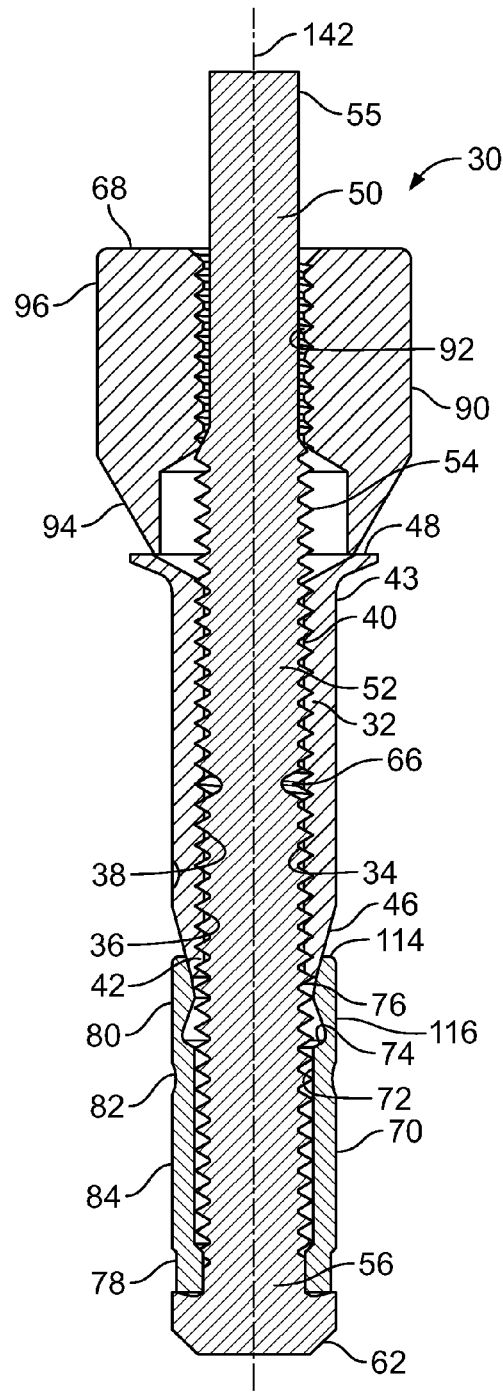
FIG. 2 is a cross-sectional view taken generally along the lines 2-2 of FIG. 1 and depicting the fastener having a body, a translating threaded corebolt disposed within the body and having a breaking groove, a sleeve disposed over the corebolt adjacent a tapered ramp at a first end of the body, and a drive nut disposed adjacent an enlarged head at a second end of the body.

Referring to FIGS. 1 and 2, a first embodiment of a fastener or blind bolt 30 in accordance with the present disclosure includes a generally cylindrical body 32 having a passage 34 disposed through a central portion of the body 32. An inner surface 36 of a wall 38 forming the passage 34 has threading 40 between first and second ends 42, 43 of the body 32. A tapered ramp 46 is disposed at the first end 42 of the body 32 and an enlarged head 48 is disposed at a second end 43 of the body 32. A generally cylindrical corebolt 50 is concentrically disposed within the passage 34 of the body 32 and includes a threaded stem 51 with threading 52 on an outer surface 54 of the corebolt 50 extending from a second end 55 of the corebolt 50 throughout almost an entire length of the corebolt 50 except at a first end 56 of the corebolt 50. The threading 40, 52 of the body 32 and the corebolt 50 cooperate to move portions of the body 32 and corebolt 50 with respect to one another, as will be discussed in greater detail hereinafter.

An enlarged head 62 is disposed at the first end 56 of the corebolt 50 and opposing wrenching flats 64 are disposed at the second end 55 of the corebolt 50 and extend out of the body 32. A generally circumferential break groove 66 is disposed in a central portion of the corebolt 50 and is sized to fracture at a predetermined level of applied torque and positioned to break approximately flush with an outer surface 68 of the fastener 30, as will be discussed in greater detail hereinafter.

A deformable cylindrical sleeve 70, as seen in FIGS. 1, 2, and 8, includes a throughbore 72, a weakened interior region 74, and an interior tapered bore 76. The sleeve 70 is positioned at the first end 56 of the corebolt 50 with a first end 78 of the sleeve 70 adjacent the enlarged head 62 of the corebolt 50 and a second end 80 of the sleeve 70 in overlapping relation with the first end 42 of the body 32 with the interior tapered bore 76 adjacent the tapered ramp 46.

As seen in FIGS. 1, 2, 7, and 8, one or more shallow grooves 82 may be provided in an outer surface 84 of the sleeve 70. Optionally, a single circumferential groove 82 may be provided. The groove(s) 82 provides a weakened location where a bulbed region reverses the direction of folding, thereby allowing the region that folds to flatten upon itself.

The fastener 30 includes a drive nut 90 having a generally threaded bore 92 that is disposed in threaded engagement with the second end 55 of the corebolt 50. The drive nut 90 includes first and second ends 94, 96 with the first end 94 bearing against the enlarged head 48 of the body 32. Optionally, the drive nut 90 may be removed completely and/or the enlarged head 48 of the body 32 may incorporate a cruciform or other shaped recess that is used to restrict rotation of the body 32 during installation.

FIGS. 3A-6B depict the fastener 30 of FIGS. 1 and 2 as the fastener 30 is installed within a workpiece 110. The fastener 30 may be installed using any installation tool known in the art. The workpiece 110 is comprised of two or more sheets, or panels, of material, or two or more structural elements.

Figure 5B:
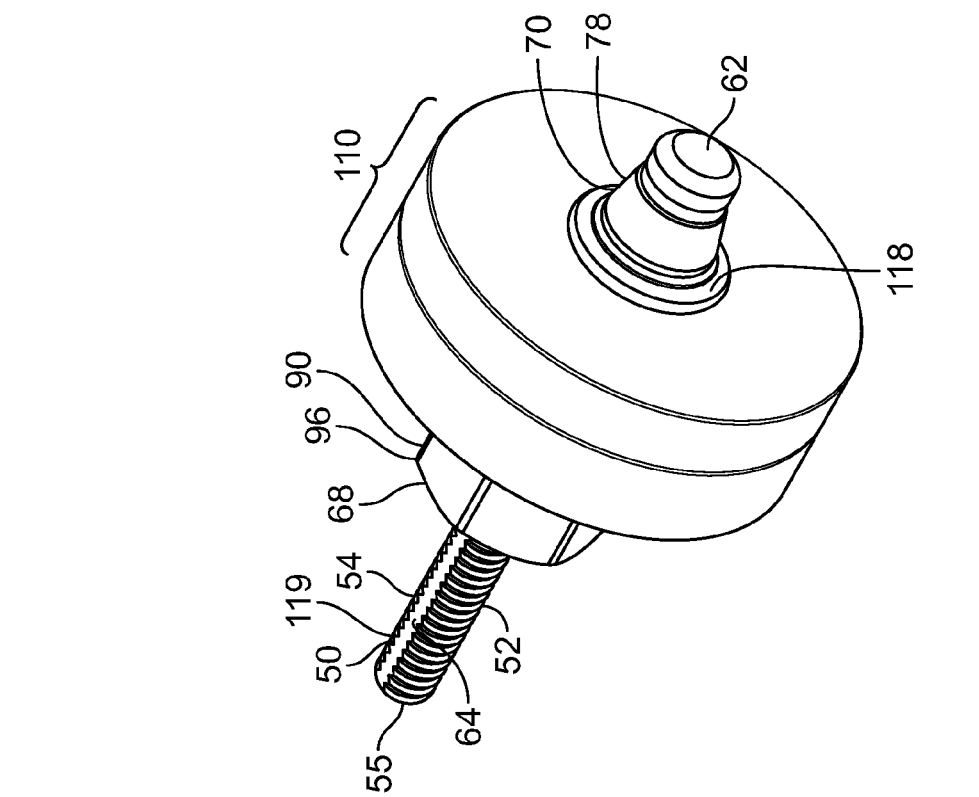
FIG. 5B is a perspective view depicting the phase of installation of FIG. 5A.
Figure 5A:
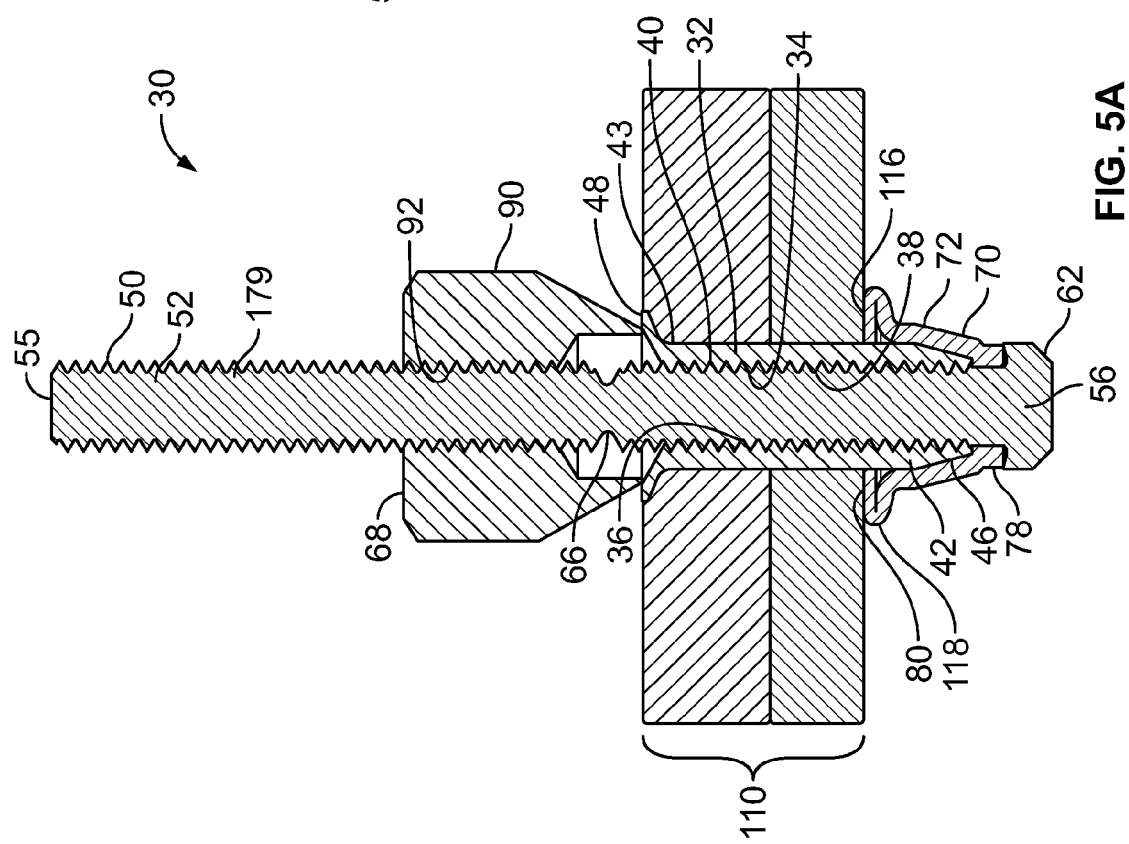
FIG. 5A is a cross-sectional view similar to that of FIG. 3A after continued rotation of the corebolt has caused the sleeve to form a blind head adjacent the workpiece.
Figure 6A:
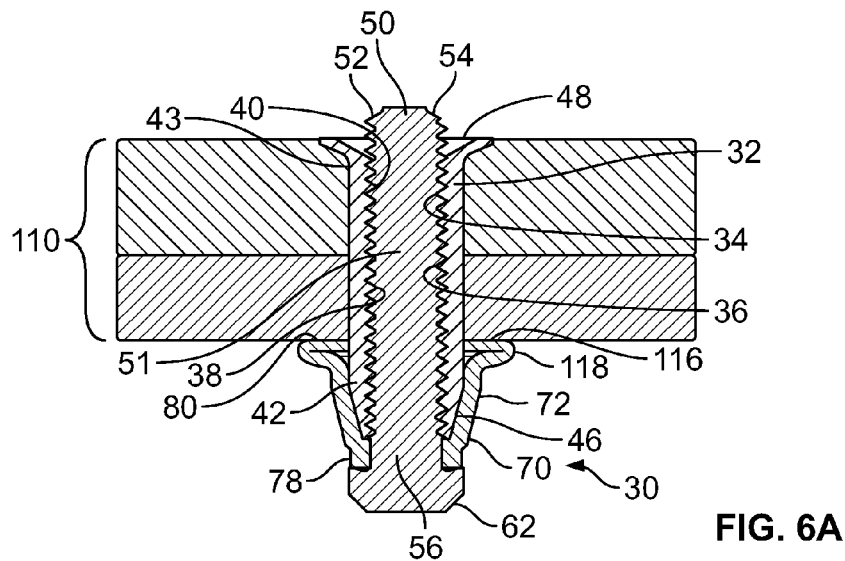
FIG. 6A is a cross-sectional view similar to that of FIG. 3A in which continued rotation of the corebolt has caused a break at a break groove, allowing a pintail and the drive nut to be discarded.
Figure 6B:
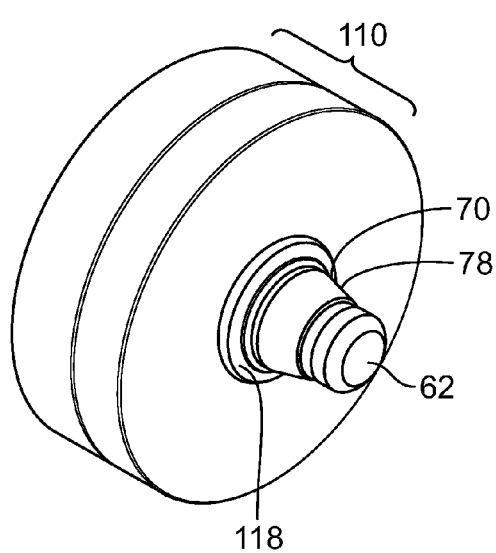
FIG. 6B is a perspective view depicting the phase of installation of FIG. 6A.
Figure 7A:
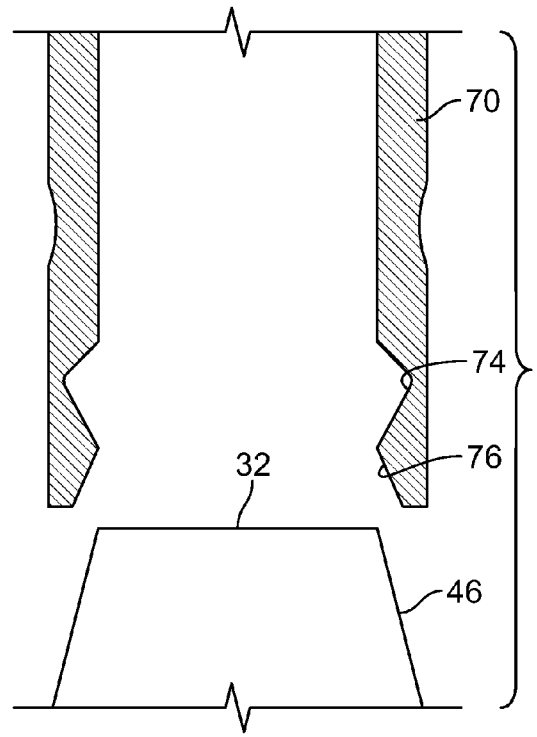
Figure 7B:
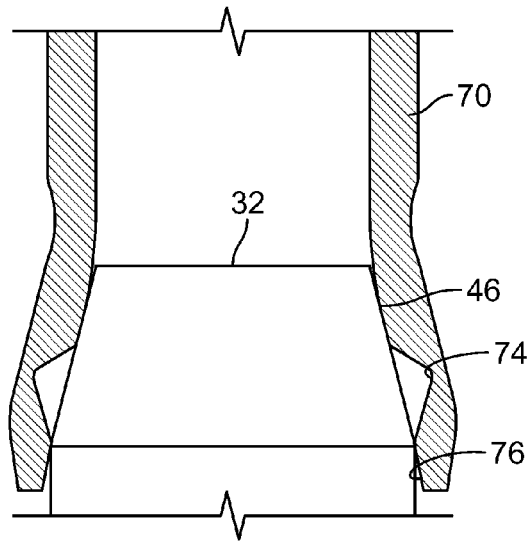
Figure 7C:
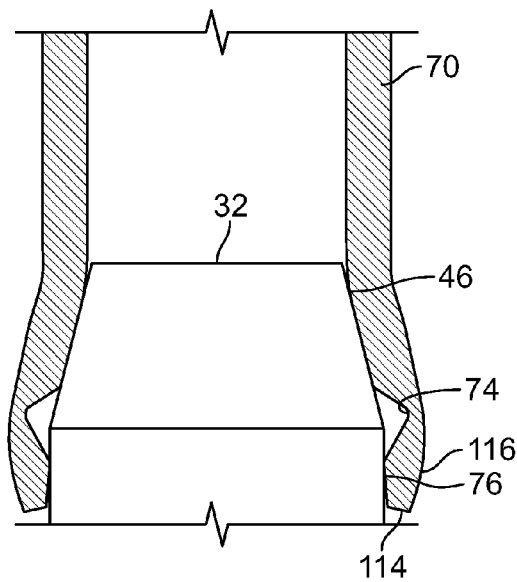
Figure 7D:
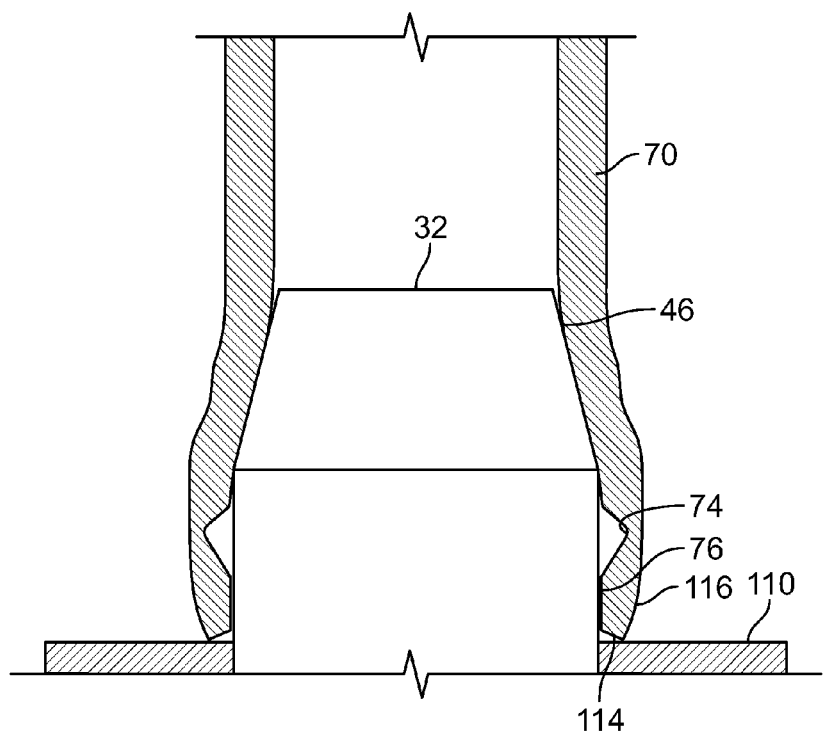
Figure 7E:
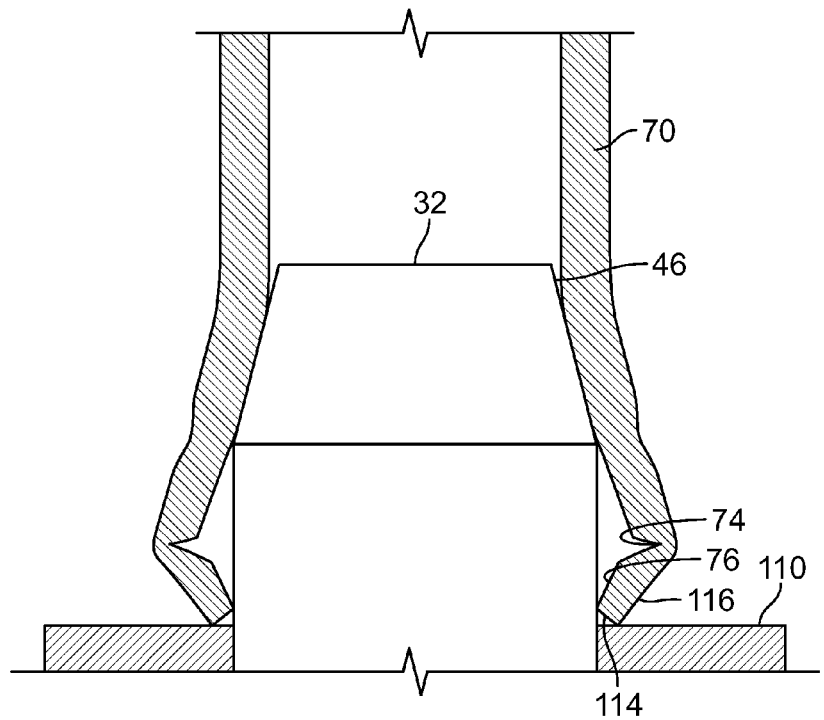
Figure 7F:
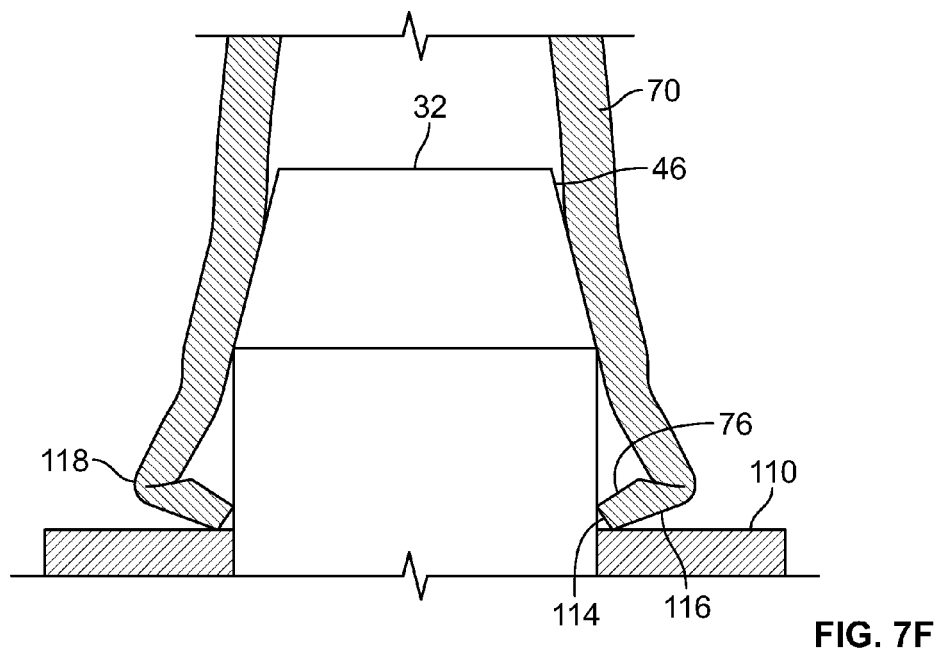

Before installation of the fastener 30 within the workpiece 110, the fastener 30 is placed into aligned apertures of the workpiece 110, as seen in FIGS. 3A and 3B. The corebolt 50 is thereafter rotated, while the body 32 is rotationally restricted. This action causes the enlarged head 62 of the corebolt 50 to move toward the workpiece 110 along the body 32, thereby pushing the sleeve 70 toward the workpiece 110 up the tapered ramp 46 of the body 32 and into contact with a surface 112 of the workpiece 110, as seen in FIGS. 4A and 4B. The interior tapered bore 76 causes the sleeve 70 to take on a slightly bulbed profile before contact with the workpiece 110 (FIGS. 4A and 4B) so that the compressive force needed to continue the bulbing action is minimized. Minimizing the bulbing forces exerted on the workpiece 110 during the bulbing phase until the sleeve 70 has completed its formation results in a distribution of compressive forces over a larger region, thereby minimizing possible damage to the workpiece 110 during installation. Further rotation of the corebolt 50, as seen in FIGS. 5A and 5B, compresses a surface 114 of the sleeve 70 against the workpiece 110, causing the sleeve 70 to bulb outwardly at the weakened interior region 74 and causing a portion of an outer surface 116 of the sleeve 70 to compress against the workpiece 110 to form a blind head 118. A groove 82 may be used to control the flattening of the bulb during this phase of the installation. The torque required to continue rotation of the corebolt 50 greatly increases after the blind head 118 has been completely formed.

The break groove 66 in the corebolt 50 is sized to fracture at a torque in excess of that required to form the blind head 118, allowing a pintail 119 to break free from the fastener 30 (FIGS. 6A and 6B) and further allowing the pintail 119 and the drive nut 90 to be discarded.

FIGS. 7A-7G depict various stages of the sequence of forming the blind head 118 as predicted by computer simulation.

Figure 9:
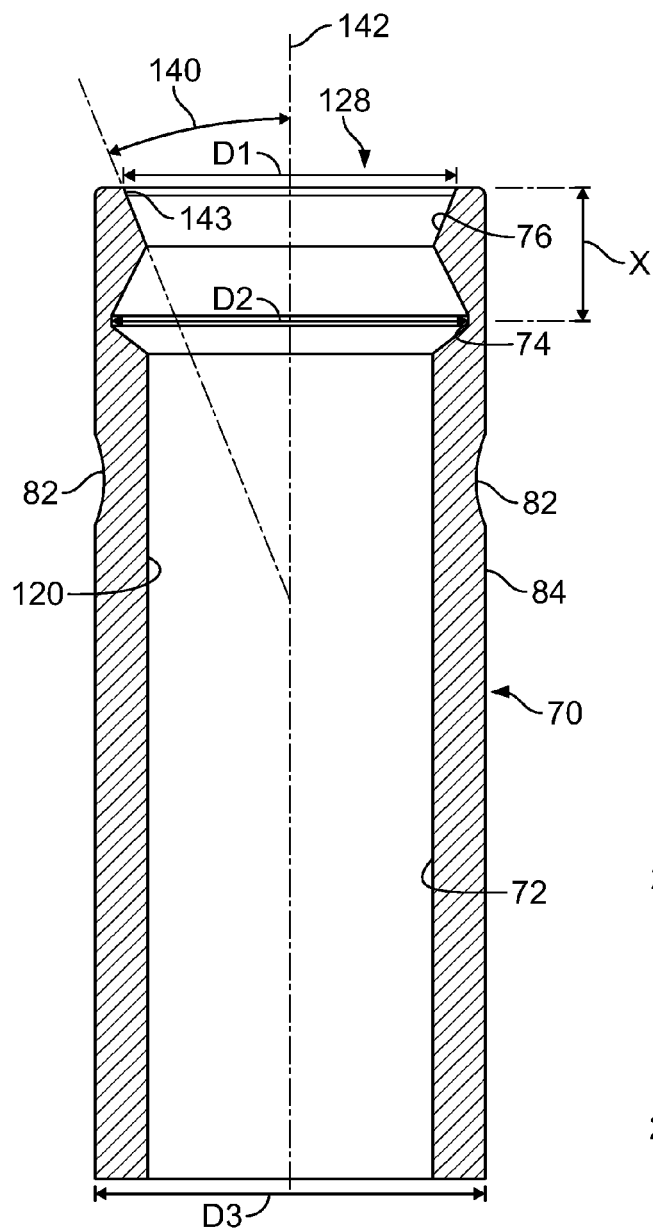

FIGS. 8 and 9 depict one manner in which the weakened interior region 74 and interior tapered bore 76 within the sleeve 70 are formed. Specifically, as seen in FIG. 8, the sleeve 70 is machined with two generally cylindrical bore sections 120, 122 and a tapered section 124 connecting the bore sections 120, 122. A slightly outwardly tapered section 126 is disposed between the bore section 122 and an opening 128 at the second end 80 of the sleeve 70. The second end 80 of the sleeve 70 is then compressed or crimped inwardly t creating the weakened interior region 74 and interior tapered bore 76 as seen in FIG. 9. Compression of second end 80 of the sleeve 70 can be performed by any means known in the art, such as pushing the sleeve through a sizing die or crimping in a collet.

The tapered bore 76 may be formed with any profile in which a thickness of a wall of the sleeve 70 increases from the second end 80 toward the first end 78 of the sleeve 70. When a tapered or conical bore 76 is used, the angle 140 (FIG. 9) should be between about 5 degrees and about 30 degrees, and more preferably about 17 degrees with respect to the central axis 142 (FIGS. 2 and 9) of the fastener 30 and the sleeve 70. An inner diameter D1 of the sleeve 70 at a leading edge 143 of the tapered bore 76 may also be smaller than an inner diameter D2 of the sleeve 70 at the weakened interior region 74. In addition, a distance X between the leading edge 142 of the tapered bore 76 and the weakened interior region 74 may be between about 30% and about 50% of an outer diameter D3 of the sleeve 70.

Figure 10:
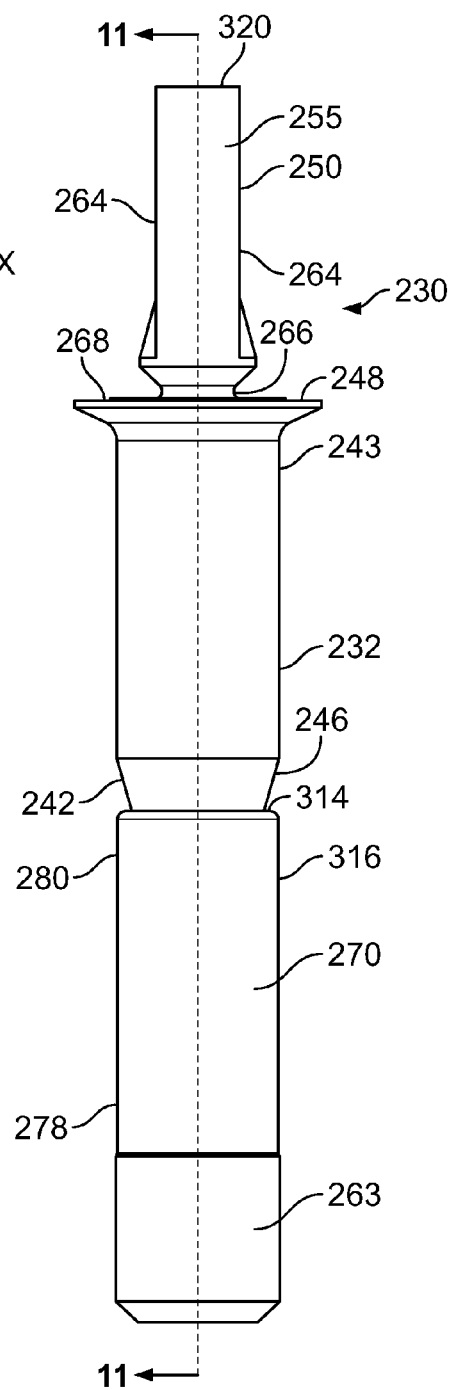
FIG. 10 is a side elevational view of a second embodiment of a fastener that may be used to connect two or more panels forming a workpiece by a single operator or mechanic.
Figure 11:
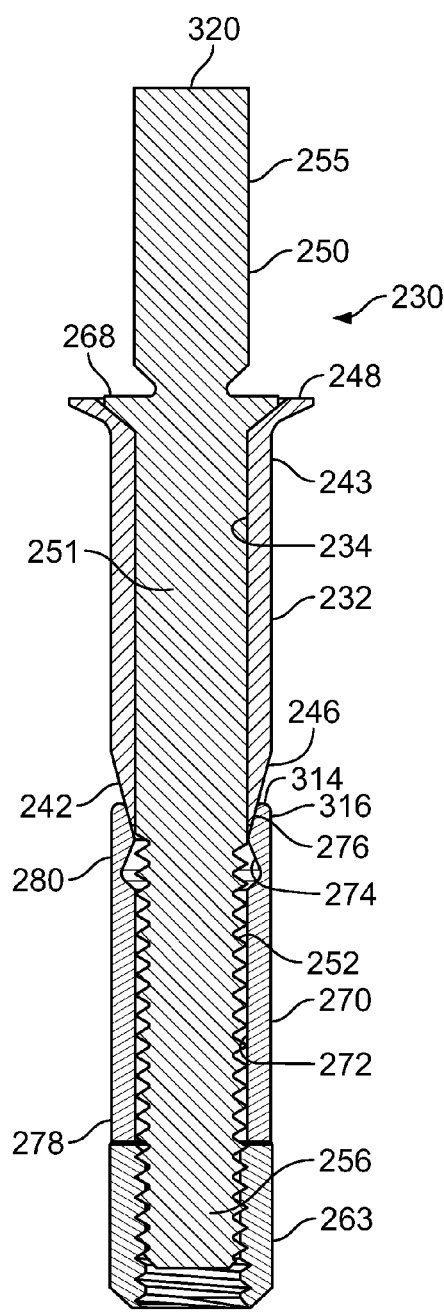
FIG. 11 is a cross-sectional view taken generally along the lines 10-10 of FIG. 10 and depicting the fastener having a body, a non-translating threaded corebolt disposed within the body and having a breaking groove, a sleeve disposed over the corebolt adjacent a tapered ramp at a first end of the body, and a nut disposed adjacent the sleeve at a second end of the corebolt.

A second embodiment of a fastener or blind bolt 230 in accordance with the present disclosure and as shown in FIGS. 10 and 11 includes a generally cylindrical body 232 having a cylindrical passage 234 disposed through a central portion of the body 232. A tapered ramp 246 is disposed at a first end 242 of the body 232 and an enlarged head 248 is disposed at a second end 243 of the body 232. A generally cylindrical and non-translating corebolt 250 is concentrically disposed within the passage 234 of the body 232 and includes a stem 251 with threading 252 on a first end 256 thereof and a second end 255 extending out of the body 232.

A nut 263 is threadedly attached to the first end 256 of the corebolt 250 and opposing wrenching flats 264 are disposed at the second end 255 of the corebolt 250 and extend out of the body 232. A break groove 266 is disposed in the corebolt 250 and is sized to fracture at a predetermined level of applied torque and positioned to break approximately flush with an outer surface 268 of the fastener 230, as will be discussed in greater detail hereinafter.

As with the first embodiment, a deformable cylindrical sleeve 270 includes a throughbore 272, a weakened interior region 274, and an interior tapered bore 276. The sleeve 270 is positioned at the first end 256 of the corebolt 250 with a first end 278 of the sleeve 270 adjacent the nut 263 and a second end 280 of the sleeve 270 in overlapping relation with the first end 242 of the body 232 with the interior tapered bore 276 adjacent the tapered ramp 246.

The fastener 230 is installed within a workpiece 110 in a manner similar to the fastener 30 of the first embodiment. In particular, the fastener 230 is inserted within aligned apertures of the workpiece 110. The corebolt 250 is thereafter rotated, while the body 232 is rotationally restricted. This action causes the nut 263 attached to the first end 256 of the corebolt 250 to move inwardly along the corebolt 250, thereby pushing the sleeve 270 inwardly toward the workpiece 110 up the tapered ramp 246 of the body 232 and into contact with the surface 112 of the workpiece 110. The interior tapered bore 276 causes the sleeve 270 to take on a slightly bulbed profile before contact with the workpiece 110 so that the compressive force needed to continue the bulbing action is minimized. Further rotation of the corebolt 250 compresses a surface 314 of the sleeve 270 against the workpiece 110, causing the sleeve 270 to bulb outwardly at the weakened interior region 274 and causing a portion of an outer surface 316 of the sleeve 270 to compress against the workpiece 110 to form a blind head in the same manner as described with respect to the first embodiment. The torque required to continue rotation of the corebolt 250 greatly increases after the blind head has been completely formed. The break groove 266 in the corebolt 250 is sized to fracture at a torque in excess of that required to form the blind head, allowing a pintail 320 to break free from the fastener 230 and further allowing the pintail 320 to be discarded.

Figure 12:
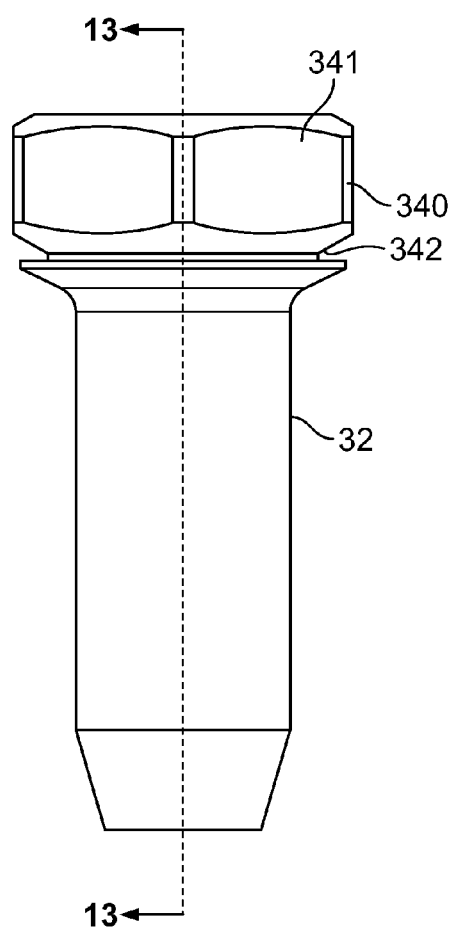
FIG. 12 is a side elevational view of a frangible drive nut for use with a fastener and which is broken off of the fastener after installation.
Figures 13, 14:
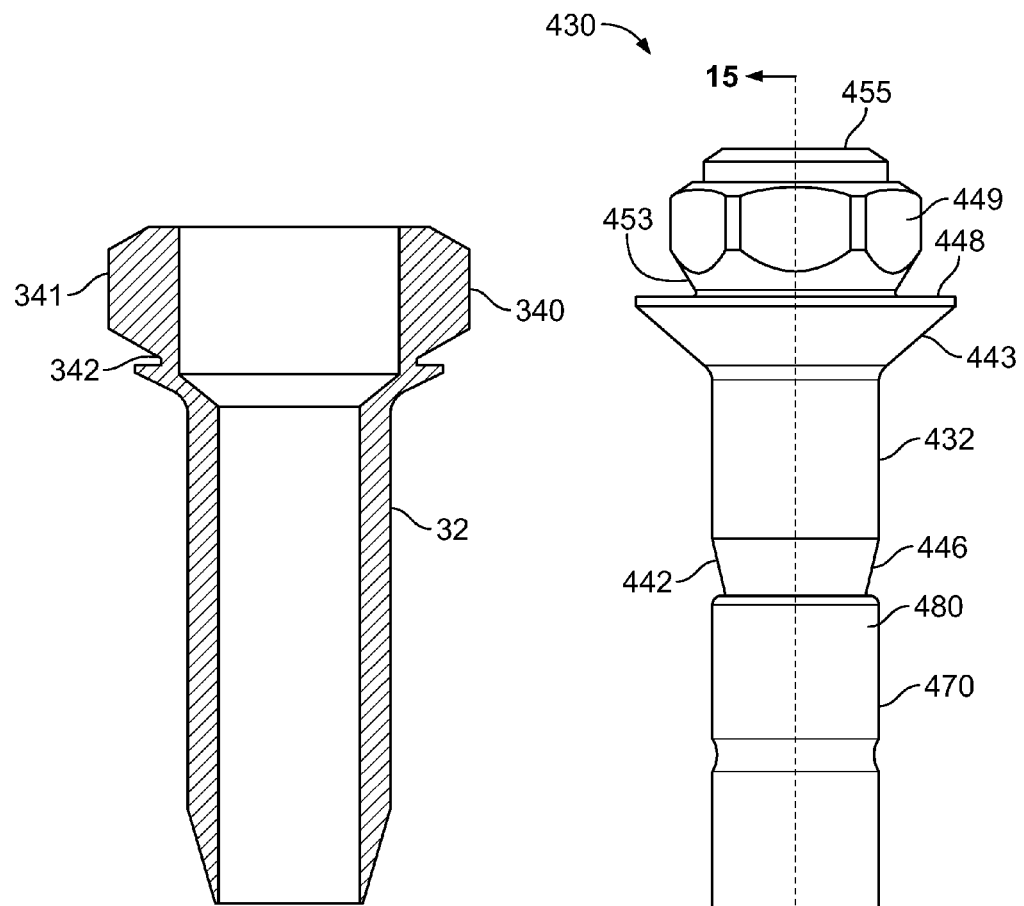
FIG. 13 is a cross-sectional view taken generally along the lines 13-13 of FIG. 12.
FIG. 14 is a side elevational view of a third embodiment of a fastener that may be connected to two or more panels forming a workpiece by a single operator or mechanic.
Figure 15:
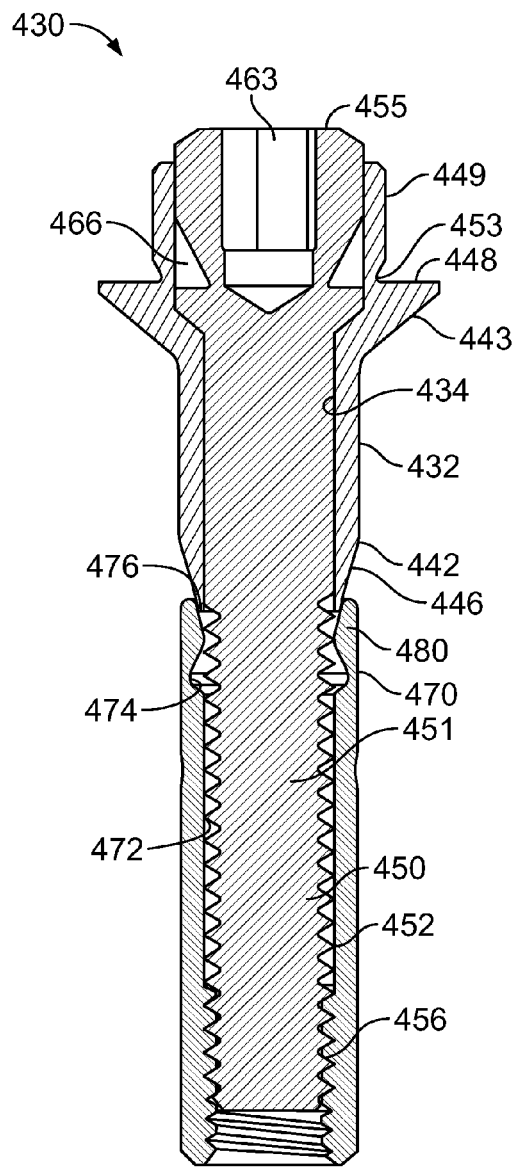
FIG. 15 is a cross-sectional view taken generally along the lines 15-15 of FIG. 14 and depicting the fastener having a body having a frangible drive nut similar to that of FIGS. 12 and 13, a non-translating threaded corebolt disposed within the body and having a breaking groove, and a sleeve disposed over the corebolt adjacent a tapered ramp at a first end of the body.
Figure 16:
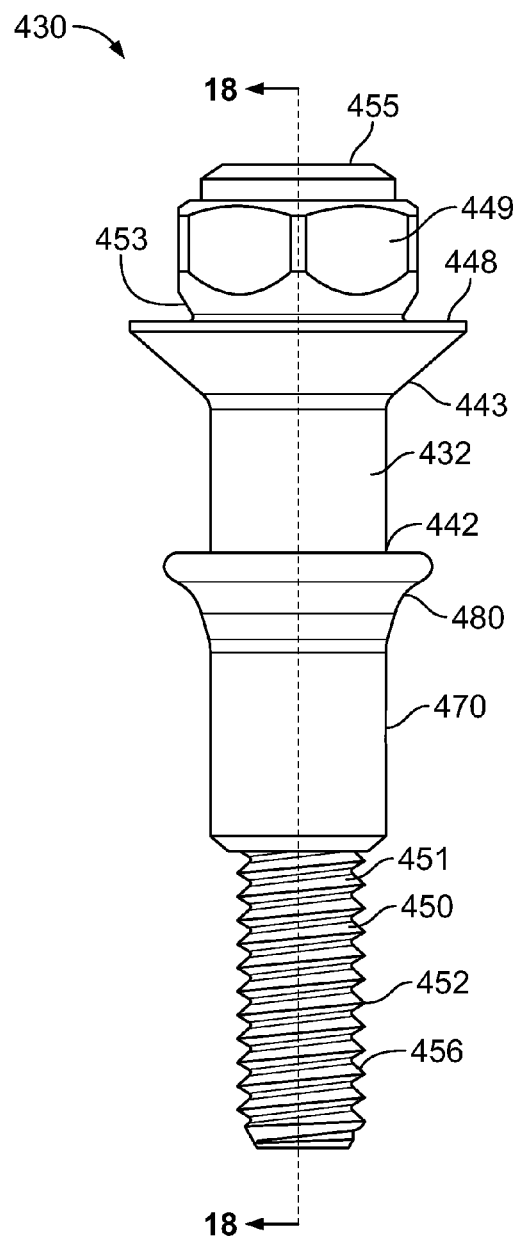
FIG. 16 is a side elevational view of the fastener of FIG. 14 after installation within a workpiece.
Figure 18:
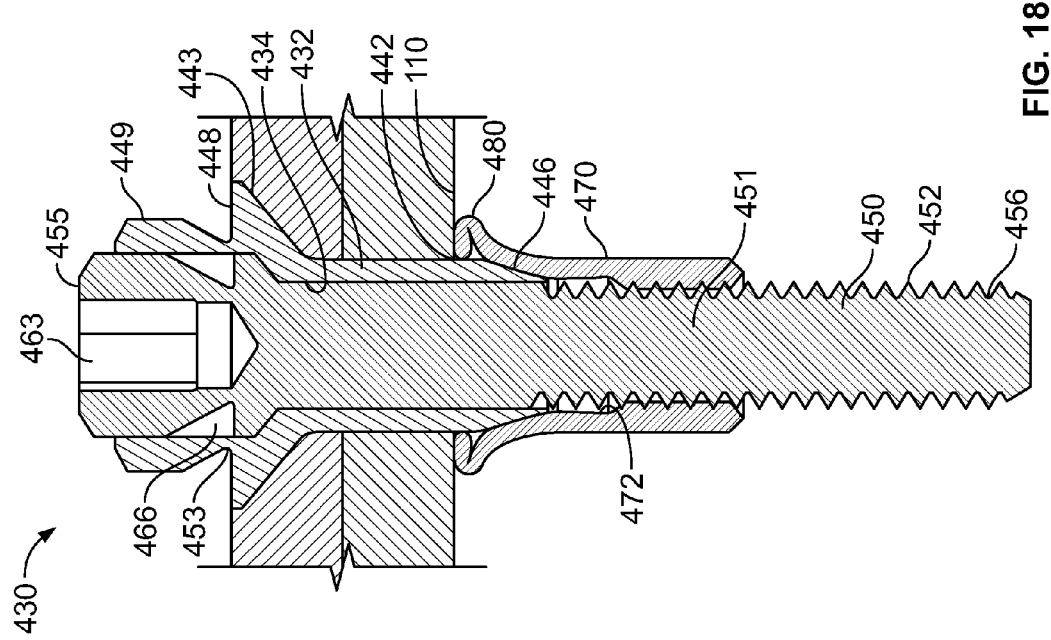
FIG. 18 is a cross-sectional view taken generally along the lines 18-18 of FIG. 16 after installation of the fastener within a workpiece and depicting a blind head formed by the fastener.
Figure 17:
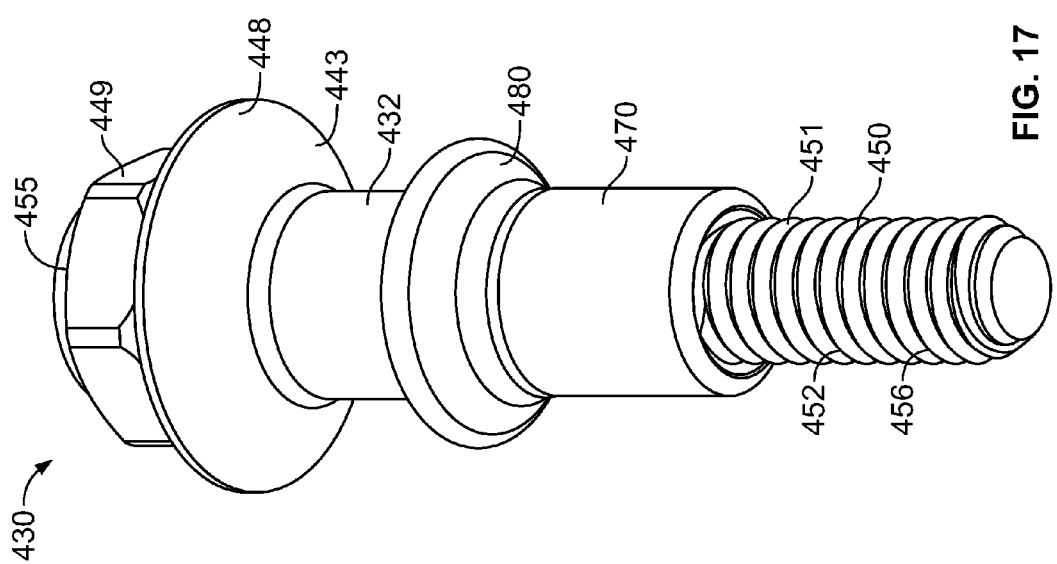
FIG. 17 is a bottom perspective view of the fastener of FIG. 16 (with the workpiece hidden)

With any of the embodiments described herein, the body may be formed integrally with a frangible drive nut 340, as seen in FIGS. 12 and 13, that may be broken off after installation. The frangible nut 340 provides a wrenching region 341 that is integral with the body and which is used to rotationally restrain the body during installation. The wrenching region 341 may include a break groove 342 sized to allow the wrenching region 341 to be severed from the body upon completion of installation. For example, the drive nut 340 may be removed after installation with a standard wrench or by twisting the installation tool. The break groove 342 would need to be sized to withstand the reaction torque of installation (which is approximately equal to the torque required to bring the sleeve into contact with the workpiece 110). The nut 340 also eliminates the need for driving recesses in applications in which aerodynamics or appearance is important.

A third embodiment of a fastener or blind bolt 430 in accordance with the present disclosure and as shown in FIGS.

14-18 is similar to the embodiment of FIGS. 10 and 11. The fastener 430 includes a body 432 having a cylindrical passage 434 disposed through a central portion of the body 432. A tapered ramp 446 is disposed at a first end 442 of the body 432 and an enlarged head 448 is disposed at a second end 443 of the body 432. The body 432 and enlarged head 448 are similar to the frangible drive nut 340 of FIGS. 12 and 13, wherein the enlarged head 448 provides wrenching surfaces 449 and a break recess 453. A generally cylindrical and non-translating corebolt 450 is concentrically disposed within the passage 434 of the body 432 and includes a stem 451 with threading 452 on a first end 456 thereof and a second end 455 extending out of the body 432. The corebolt includes first and second ends 456, 455 with a female driving recess 463 disposed at the second end 455. A break recess 466 similar to that discussed above is disposed in the corebolt 450.

A deformable cylindrical sleeve 470 includes a through-bore 472, a weakened interior region 474, and an interior tapered bore 476. Rather than including a separate nut at the first end 456 of the corebolt 450, the nut is integral with the sleeve 470, and thus, the sleeve 470 extends beyond the first end 456 of the corebolt 450. A second end 480 of the sleeve 470 is in overlapping relation with the first end 442 of the body 432 with the interior tapered bore 476 adjacent the tapered ramp 446. The sleeve 470 and integral nut may be used in lieu of the nut 263 and sleeve 270 as shown in FIGS. 10 and 11.

The fastener 430 is installed within a workpiece 110 in the same manner as described above with respect to the second embodiment. The only differences are that the fastener 430 will sever at both the both of the break recesses 453, 466 and the sleeve 470 itself provides movement of the sleeve 470 along the body 432 (rather than the nut doing so).

Figure 20:
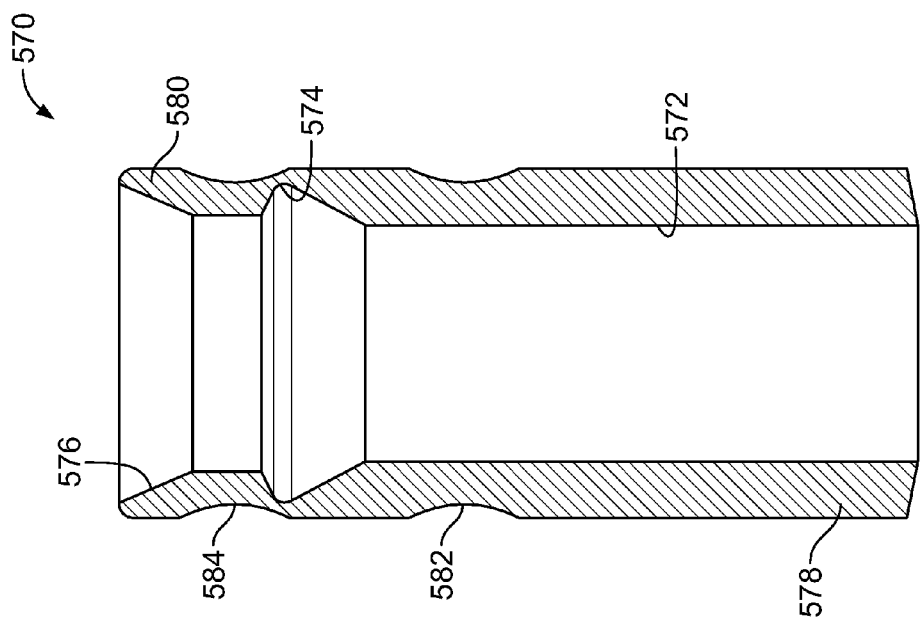
FIG. 20 is a cross-sectional view taken generally along the lines 20-20 of FIG. 19.
Figure 19:
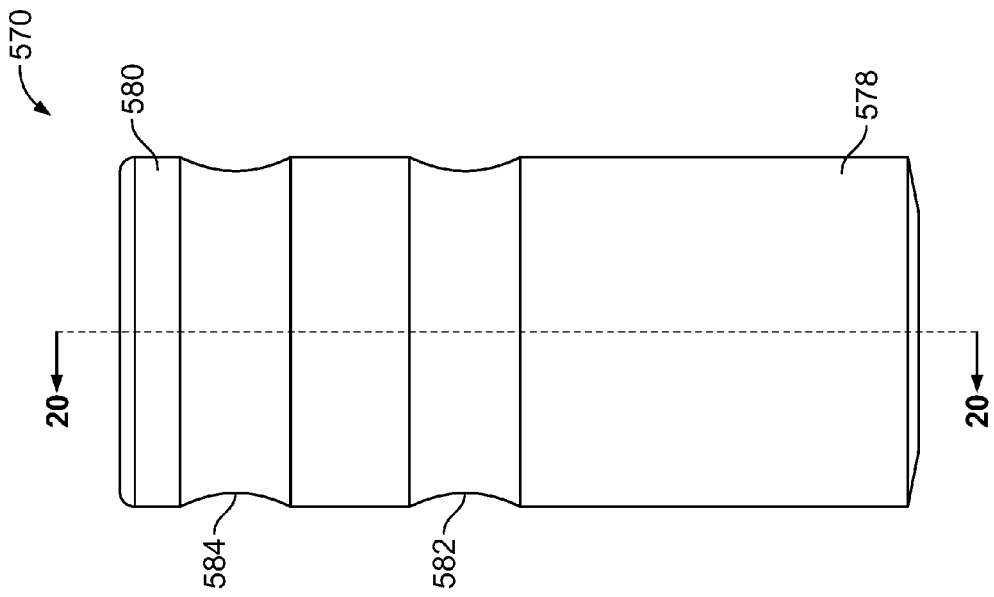
FIG. 19 is a side elevational view of a further embodiment of a sleeve.

A further embodiment of a sleeve 570 is depicted in FIGS. 19 and 20. The sleeve 570 includes a throughbore 572, a weakened interior region 574, and an interior tapered bore 576. As with other embodiments, the sleeve 570 is positioned at the first end 56 of the corebolt with a first end 578 of the sleeve 570 adjacent the enlarged head 62 of the corebolt 50 or the nut 263 and a second end 580 of the sleeve 570 adjacent the first end 42 of the body 32 with the tapered bore 576 adjacent the tapered ramp 46. The tapered bore 576 may have the same dimensions and angles as described with respect to other embodiments herein. First and/or second grooves 582, 584 may be provided in an outer surface 586 of the sleeve 570. The groove 582, if present, provides a weakened location where a bulbed region reverses direction of folding, thereby allowing the region that folds to flatten upon itself, as describe in detail above and shown in at least FIG. 7G. The groove 584, if present, is disposed between the groove 582 and the second end 580 of the sleeve 570. The groove 584 allows a portion of the sleeve that bears against the workpiece to lay flatter after installation of the fastener. While the grooves 582, 584 are shown as being continuous, circumferential grooves in the outer surface of the sleeve 570, the grooves 582, 584 may optionally be formed of discontinuous grooves or two or more depressions that reduce a wall thickness at discrete points. In addition, only the groove 582 may be utilized or only the groove 584 may be utilized.

The bodies of the fasteners disclosed herein may be made by conventional heading and machining processes well known in the fastener manufacturing industry. Typical body materials include, but are not limited to, titanium alloy Ti-6AI-4V, A-286 CRES, and the like, and combinations thereof. Common wrenching means for the bodies herein include, but are not limited to, a cruciform recess in the head of fasteners with a head that is flush with a workpiece or hexagonal surface geometry on fasteners having a protruding head.

The corebolts described herein may be made from materials including, but not limited to, titanium alloy, A-286, and the like, and combinations thereof. Optionally, other materials may be satisfactory depending on the application. The wrenching flats or surfaces for the corebolts (drive nuts) herein are made for engagement by an installation tool. During manufacture, once the corebolt is heat treated and cleaned, the corebolt should be lubricated with dry film lubricant (for example, a molybdenum disulfide lubricant in a phenolic binder that is dry to the touch) to reduce friction at an interface between threaded portions of the corebolt and the body. The fabrication of corebolts is generally known in the art.

The sleeves of the present disclosure may be made from any malleable metal, for example, annealed AISI 304 stainless steel. Dry film lubricant may be applied to an inner surface of the sleeves to reduce friction. The sleeves may be formed by progressive forging operations or by machining from bar stock followed by a swaging or crimping operation to produce a uniform cylindrical outer profile. The sleeves may alternatively be produced by machining alone. Crimping of sleeve blanks to produce a uniform outer profile (as discussed in relation to FIGS. 8 and 9) may be performed with standard slotted collets as commonly used in lathe equipment or with collet crimpers. Alternatively, swaging may be performed by pushing the sleeve blanks through a sizing die to produce a uniform outer profile.

Although the fasteners of the present disclosure are described as being for use in aircraft structures, the fasteners may be used for any application in which a blind bolt can be utilized, for example, in submersibles, race cars, and the like.

Applicant has provided descriptions and figures that are intended as an illustration of certain embodiments of the present disclosure. The disclosure of the figures and descriptions thereof are not intended to be construed as containing or implying limitation of the disclosure to those embodiments. Though applicant has described various aspects of the disclosure with respect to specific embodiments, various alternative and modifications will be apparent from the present disclosure that are not within the scope and spirit of the present disclosure as set forth herein. Further, it should be understood that any aspects of any of the embodiments disclosed herein or similar aspects or structure may be combined or interchanged.

I claim:

1. A fastener, comprising:
    a body defining a first cylindrical bore formed through the body along a longitudinal axis, an outer surface including an external cylindrical surface and an external tapering ramp surface disposed at an end of the body between the end of the body and the outer cylindrical surface;
    a corebolt positioned within the cylindrical bore of the body; and
    a sleeve defining:
        a second cylindrical bore extending between first and second ends of the sleeve along a centerline;
        a first tapering interior surface extending inwardly toward the centerline as the first tapering interior surface extends from the second end toward the first end;
        a radial internal groove in the second cylindrical bore positioned between the first tapering interior surface and the first end of the sleeve;

wherein the corebolt is positioned within the second cylindrical bore with the sleeve positioned with the first tapering interior surface adjacent the tapering ramp surface of the body;

wherein the sleeve is adapted to be movable relative to the body to forcibly deform the sleeve around the tapering ramp surface to radially expand the sleeve;

wherein, when the sleeve is forcibly deformed around the tapering ramp surface, the first tapering interior surface is adapted to slide relative to the tapering external ramp with the first tapering interior surface substantially conforming against the body during the entire process of forcibly expanding the sleeve around the tapering ramp surface;

wherein, when the sleeve is radially expanded sufficiently that the first tapering interior surface conforms against the outer cylindrical surface of the body, a first outer diameter of the expanded sleeve at the second end of the expanded sleeve is less than a second outer diameter of the expanded sleeve surrounding the internal groove of the expanded sleeve; and wherein, after the sleeve is radially expanded, the expanded sleeve is adapted to bulb radially outwardly at the internal groove when the expanded sleeve is advanced further relative to the body and the second end of the expanded sleeve is compressed against a workpiece.

2. The fastener of claim 1, wherein the internal groove is defined by the juncture of a second tapering interior surface extending outwardly away from the centerline as the second tapering interior surface extends from the first tapering interior surface toward the first end and a third tapering interior surface extending inwardly toward the centerline as the third tapering interior surface extends from the second tapering interior surface toward the first end.

3. The fastener of claim 2, wherein the internal groove is further defined by a stress relieving transition at the juncture between the second and third tapering interior surfaces.

4. The fastener of claim 3, wherein the stress relieving transition is a radius.

5. The fastener of claim 3, wherein the stress relieving transition is a cylindrical interior surface parallel to the centerline of the sleeve extending between the second and third tapering interior surfaces.

6. The fastener of claim 1, wherein an angle formed between first tapering interior surface of the sleeve and the centerline of the sleeve is between about 5 degrees and about 30 degrees.

7. The fastener of claim 1, wherein an angle formed between first tapering interior surface of the sleeve and the centerline of the sleeve is about 17 degrees.

8. The fastener of claim 1, wherein the fastener is devoid of any support structure in the internal groove between the sleeve and the corebolt or body.

9. The fastener of claim 1, wherein the body and the sleeve are constructed and arranged such that the entire first tapering interior surface of the expanded sleeve is longitudinally advanced completely past the external tapering ramp surface before the second end of the sleeve contacts the workpiece.

10. The fastener of claim 1, wherein a first longitudinal distance between the second end of the sleeve and the internal groove is between about 30 percent and about 50 percent of an outer diameter of the sleeve.

11. The fastener of claim 10, wherein a second longitudinal distance between the second end of the sleeve and the furthest portion of the first tapering interior surface is approximately half the first longitudinal distance.

12. The fastener of claim 11, wherein an angle formed between first tapering interior surface of the sleeve and the centerline of the sleeve is between about 5 degrees and about 30 degrees.

13. The fastener of claim 1, wherein the corebolt is externally threaded.

14. The fastener of claim 13, wherein the sleeve is internally threaded and threadingly engaged with the corebolt.

15. The fastener of claim 13, wherein the body is internally threaded and threadingly engaged with the corebolt.

16. The fastener of claim 13, further comprising an internally threaded nut that is threadingly engaged with the corebolt, wherein the nut is positioned on the corebolt adjacent to the first end of the sleeve.

17. The fastener of claim 1, wherein the sleeve further defines a radial groove around an outer surface of the sleeve longitudinally positioned between the radial internal groove and the first end of the sleeve.

18. A fastener comprising:
a body defining a first cylindrical bore formed through the body along a longitudinal axis, an outer surface including an external cylindrical surface and an external tapering ramp surface disposed at an end of the body between the end of the body and the outer cylindrical surface;
a corebolt positioned within the cylindrical bore of the body; and
a sleeve defining:
a second cylindrical bore extending between first and second ends of the sleeve along a centerline;
a first tapering interior surface extending inwardly toward the centerline as the first tapering interior surface extends from the second end toward the first end;
a second tapering interior surface extending outwardly away from the centerline as the second tapering interior surface extends from the first tapering interior surface toward the first end;
a third tapering interior surface extending inwardly toward the centerline as the third tapering interior surface extends from the second tapering interior surface toward the first end;
a stress relieving transition in the juncture between the second and third tapering interior surfaces;
wherein the corebolt is positioned within the second cylindrical bore with the sleeve positioned with the first tapering interior surface adjacent the tapering ramp surface of the body;
wherein the first, second and third tapering interior surfaces each individually approximate the geometric shape of segment of a right circular conical inside surface;
wherein the sleeve is adapted to be movable relative to the body to forcibly deform the sleeve around the tapering ramp surface to radially expand the sleeve; and
wherein the expanded sleeve is adapted to bulb radially outwardly at the stress relieving transition when the expanded sleeve is advanced further relative to the body and the second end of the expanded sleeve is compressed against a workpiece.

19. The fastener of claim 18, wherein the stress relieving transition is a radius.

20. The fastener of claim 18, wherein the stress relieving transition is a cylindrical interior surface parallel to the centerline of the sleeve extending between the second and third tapering interior surfaces.

21. The fastener of claim 18, wherein an angle formed between first tapering interior surface of the sleeve and the centerline of the sleeve is between about 5 degrees and about 30 degrees.

22. The fastener of claim 18, wherein an angle formed between first tapering interior surface of the sleeve and the centerline of the sleeve is about 17 degrees.

23. The fastener of claim 18, wherein a void space defined by the second and third internal grooves and the stress relieving transition is devoid of any support structure positioned between the sleeve and the corebolt or body.

24. The fastener of claim 18, wherein a first longitudinal distance between the second end of the sleeve and the internal groove is between about 30 percent and about 50 percent of an outer diameter of the sleeve.

25. The fastener of claim 24, wherein a second longitudinal distance between the second end of the sleeve and the furthest portion of the first tapering interior surface is approximately half the first longitudinal distance.

26. The fastener of claim 25, wherein an angle formed between first tapering interior surface of the sleeve and the centerline of the sleeve is between about 5 degrees and about 30 degrees.

27. The fastener of claim 18, wherein the corebolt is externally threaded.

28. The fastener of claim 27, wherein the sleeve is internally threaded and threadingly engaged with the corebolt.

29. The fastener of claim 27, wherein the body is internally threaded and threadingly engaged with the corebolt.

30. The fastener of claim 27, further comprising an internally threaded nut that is threadingly engaged with the corebolt, wherein the nut is positioned on the corebolt adjacent to the first end of the sleeve.

31. The fastener of claim 18, wherein the sleeve further defines a radial groove around an outer surface of the sleeve longitudinally positioned between the radial internal groove and the first end of the sleeve.

32. A deformable sleeve for use with a fastener that includes a body defining a first cylindrical bore formed through the body along a longitudinal axis, an outer surface including an external cylindrical surface and an external tapering ramp surface disposed at an end of the body between an end of the body and the outer cylindrical surface and a corebolt positioned within the cylindrical bore of the body, the deformable sleeve comprising:
  a cylindrical body defining:
    a second cylindrical bore extending between first and second ends of the cylindrical body along a centerline;
    a first tapering interior surface extending inwardly toward the centerline as the first tapering interior surface extends from the second end toward the first end;
    a radial internal groove in the second cylindrical bore positioned between the first tapering interior surface and the first end of the sleeve, wherein a first longitudinal distance between the second end of the sleeve and the radial internal groove is between about 30 percent and about 50 percent of an outer diameter of the cylindrical body and wherein a second longitudinal distance between the second end of the sleeve and the furthest portion of the first tapering interior surface is approximately half the first longitudinal distance;
  wherein the sleeve is adapted to be positioned on the corebolt with the first tapering interior surface adjacent the tapering ramp surface of the body;
  wherein the sleeve is adapted to be movable relative to the body to forcibly deform the sleeve around the tapering ramp surface to radially expand the sleeve;
  wherein, after the sleeve is radially expanded, the expanded sleeve is adapted to bulb radially outwardly at the radial internal groove when the expanded sleeve is advanced further relative to the body and the second end of the expanded sleeve is compressed against a workpiece.

33. The fastener of claim 32, wherein an angle formed between first tapering interior surface of the sleeve and the centerline of the sleeve is between about 5 degrees and about 30 degrees.

34. The fastener of claim 32, wherein the radial internal groove is defined by the juncture of a second tapering interior surface extending outwardly away from the centerline as the second tapering interior surface extends from the first tapering interior surface toward the first end and a third tapering interior surface extending inwardly toward the centerline as the third tapering interior surface extends from the second tapering interior surface toward the first end.

35. The fastener of claim 32, wherein the internal groove is further defined by a stress relieving transition in the juncture between the second and third tapering interior surfaces.

36. A method of installing a fastener in a workpiece, the method comprising the steps of:
  inserting the fastener of claim 1 into the workpiece;
  moving the sleeve longitudinally relative to the body causing the first tapered surface on the sleeve to slide up the tapered ramp on the body thereby expanding the sleeve and conforming the first tapering interior surface to the outer surface of the body;
  continuing moving the expanded sleeve relative to the body until the second end of the expanded sleeve abuts the workpiece;
  after the second end abuts the workpiece, continuing moving the expanded sleeve relative to the body thereby bulbing the expanded sleeve outwardly about the radial internal groove and rotating the first tapered surface away from conforming to the outer surface of the body; and
  after the expanded sleeve bulbs outwardly, continuing moving the bulbed sleeve relative to the body until an outer surface of the sleeve conforms against the workpiece.

37. The method of claim 36, wherein fastener is devoid of any support structure in the radial internal groove between the sleeve and the body or the corebolt.

\* \* \* \* \*